United States Patent
Walpole

(10) Patent No.: US 6,311,554 B1
(45) Date of Patent: *Nov. 6, 2001

(54) CLIP-ON VISUAL BRAKE LINING WEAR INDICATOR

(75) Inventor: Scott Walpole, Kansas City, MO (US)

(73) Assignee: Haldex Brake Corporation, Kansas City, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,355

(22) Filed: Mar. 24, 1998

(51) Int. Cl.[7] ........................................ F16D 66/02
(52) U.S. Cl. ............................... 73/129; 33/609; 33/610; 340/454
(58) Field of Search ........................ 73/121, 129; 33/609, 33/310; 340/453, 454

(56) References Cited

U.S. PATENT DOCUMENTS

| 4,174,024 | * | 11/1979 | Hagiwara . |
| 4,437,547 | * | 3/1984 | Harmer . |
| 4,832,160 | * | 5/1989 | Fargier et al. . |
| 5,511,636 | * | 4/1996 | Tanaka . |
| 5,678,662 | * | 10/1997 | Giorgetti et al. . |
| 5,893,434 | * | 8/1999 | Walker et al. . |

* cited by examiner

Primary Examiner—Eric S. McCall
(74) Attorney, Agent, or Firm—St. Onge Steward Johnston & Reens LLC

(57) ABSTRACT

The invention provides a brake lining wear indicator for use with a brake pad/shoe having a friction lining secured to a plate. The indicator includes a flag positionable adjacent a thickness of the lining, and a base and a resilient member for clipping the indicator onto the plate. The base rigidly extends from the flag, generally perpendicular to the flag and is positionable against a side of the plate. The resilient member is for extending to the other side of the plate to clamp the base against the plate and secure the flag adjacent the thickness of the lining. The thickness of the lining can then be compared to the height of the flag to determine the amount of lining wear.

10 Claims, 2 Drawing Sheets

CLIP-ON VISUAL BRAKE LINING WEAR INDICATOR

FIELD OF THE INVENTION

The present invention relates to vehicle brakes and, more particularly, to brake lining wear indicators.

BACKGROUND OF THE INVENTION

In servicing motor vehicles it is necessary to periodically inspect brake pads or shoes of each brake assembly to determine the degree of wear of friction linings of the assemblies. Failure to inspect the linings and allowing them to become worn could result in damage to the brake assembly. As is known, a disk brake assembly includes a disc rotor secured to a wheel of a vehicle and brake pads, which engage side surfaces of the rotor to stop rotation of the vehicle wheel. A drum brake assembly includes a drum secured to the vehicle wheel and brake shoes, which engage an inner surface of the drum to stop rotation of the vehicle wheel. In either case, the brake pads or shoes ("brake pad/shoe") are generally made up of a friction lining secured to a metal plate, with rivets for example. To avoid damage to the rotors and the drums of the brake assemblies, the brake pad/shoes must be replaced before their friction linings wear beyond a predetermined amount and allow the rivets and metal plate to gouge the rotor or drum.

Once the used brake pad/shoes are removed they can be recycled by adding a new brake lining to the metal plate. Many existing brake pad/shoes include lines painted on the sides of the friction lining to provide a visual indication of wear. The painted lines, however, increase the costs of the friction lining by adding an additional step to the manufacturing process of the lining, and may be covered by dust or removed from the lining before the lining is sufficiently worn to merit replacement.

Some existing brake assemblies include mechanical devices for indicating lining wear. U.S. Pat. No. 3,533,491 to Svenson, for example, discloses a lining wear indicator having a manually actuated brake shoe position indicator. The indicator is manually pressed against the rear of the brake shoe and acts as a ruler to indicate lining wear. This indicator, however, is difficult to retrofit, and requires a person to handle the brake assembly as opposed to just observing it. U.S. Pat. No. 4,356,897 to Urban discloses a wear indicator including pins extending from the rear of the plate. Upon depressing the brake pedal, the pins indicate how far the plate travels before the lining contacts the rotor, and thereby indirectly indicate the amount of lining wear in comparison to the amount of travel for a new lining. The wear indicator of Urban, though, is difficult to retrofit to existing or replacement brake pads, must be calibrated, and the pedal force must be consistently applied to get an accurate comparison between the lining when new and the lining when worn.

Some existing wear-indicators are audible clip devices. U.S. Pat. No. 4,037,689 to Maehara, for example, discloses a device comprising a U-shaped resilient spring having a loop portion attached to the plate and curving away from the rotor and then back towards the rotor, and a second portion extending from the loop portion towards the disc rotor. When the lining becomes worn, the second portion of the clip contacts the rotor. Since the second portion is not rigidly secured to the plate but is flexibly secured to the plate with the loop portion, the second portion vibrates when it contacts the rotor and produces an audible alarm. A disadvantage of this indicator, however, is that the second portion does not provide a reliable visual indication of lining wear since it is not rigidly connected to the plate. In addition, the loop portion extends relatively far behind the plate and, therefore, may be difficult to fit in a compact or tightly packed brake assembly. Furthermore, the loop portion is permanently fixed to the plate with a rivet or weld and is not easy to reuse or retrofit.

U.S. Pat. Nos. 4,460,067 and 4,498,559 to Katagiri et al. also disclose audible wear-indicators for brakes. The devices generally include a vibration spring having a fixing portion secured to the plate, a spring portion extending from the fixing portion in a direction away from the rotor and curved to extend towards the rotor, and a vibrating portion extending from the spring portion towards the rotor. Whereby, when the lining becomes worn, the vibrating portion of the clip contacts the rotor. Since the vibrating portion is not rigidly secured to the plate, but is flexible secured through the spring portion, the vibrating portion vibrates upon contacting the rotor to produce an audible alarm. A drawback of these indicators is that the vibrating portion does not provide a reliable visual indication of lining wear since it is not rigidly connected to the plate. In addition, the spring portion extends relatively far behind the plate and, therefore, may be difficult to fit in a compact or tightly packed brake assembly. Furthermore, a disadvantage of all audible wear-indicators is that a person has to drive the vehicle and listen for audible alarms to determine whether some or all of the brake pad/shoes need replacement. Even then it may be hard to determine which if any indicator is making the noise.

What is desired, therefore, is a brake wear-indicating device that has a simple design and is easy to use and attach to a brake pad/shoe. Preferably, the indicating device will have the ability to be retrofit to existing brake assemblies or taken off a worn brake pad/shoe and easily attached to a replacement shoe. Furthermore, the device should provide a reliable visual indication of brake wear, without requiring that a person checking the pads actually have to disassembly or even touch the brake assembly or take the vehicle for a test drive.

SUMMARY OF THE INVENTION

An object of the present invention, therefore, is to provide a brake wear-indicating device that has a simple design and is easy to use and attach to a brake pad/shoe.

Another object of the present invention is to provide a brake wear-indicating device that can be easily retrofit to existing brake assemblies or taken off a worn brake pad/shoe and easily attached to a replacement shoe.

An additional object of the present invention is to provide a brake wear-indicating device that allows a visual inspection of brake wear, without requiring disassembly or handling of the brake assembly or test driving the vehicle.

These and other objects of the present invention are meet by an indicator for the degree of wear of a lining secured to a first side of a plate of a brake assembly. The indicator includes a base for positioning against the first side of the plate, and a flag rigidly connected to and extending from the base, generally perpendicular to the base. The flag is for extending adjacent a thickness of the lining. A resilient member is connected to the flag and is for extending to a second side of the plate to clamp the base to the plate and hold the flag in position adjacent the thickness of the lining. The thickness of the lining can then be compared to a height of the flag to determine lining wear.

The present invention, accordingly, provides a brake wear-indicating device that has a simple design, is easy to use and easy to attach to a brake pad/shoe. The base and resilient member of the indicator can easily be clipped onto the brake pad/shoe to facilitate retrofitting existing brake assemblies or taking the indicator off a worn brake pad/shoe and attaching it to a replacement shoe. The indicator also allows a visual inspection of brake wear, without requiring disassembly or handling of the brake assembly or test driving the vehicle.

According to one aspect of the present invention, the resilient member includes a spacer portion extending from the flag generally perpendicular to the base, and a gripping portion extending from the spacer portion generally parallel to the base. The gripping portion has a contact point spaced from the base less than a thickness of the plate to clamp the base to the plate.

The invention and its particular features and advantages will become more apparent from the following detailed description considered with reference to the accompanying drawings.

DETAILED DESCRIPTION OF THE INVENTION

Figure 1:
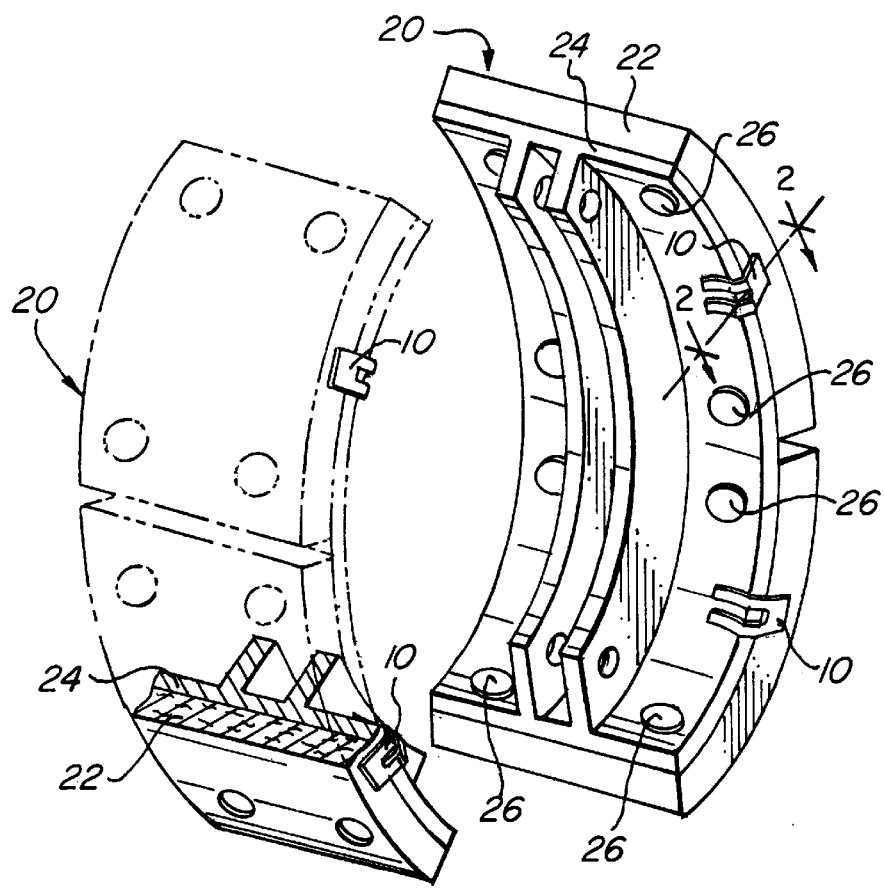
FIG. 1 is a side isometric view, partially cut-away, of two brake pad/shoes according to the present invention.
Figure 2:
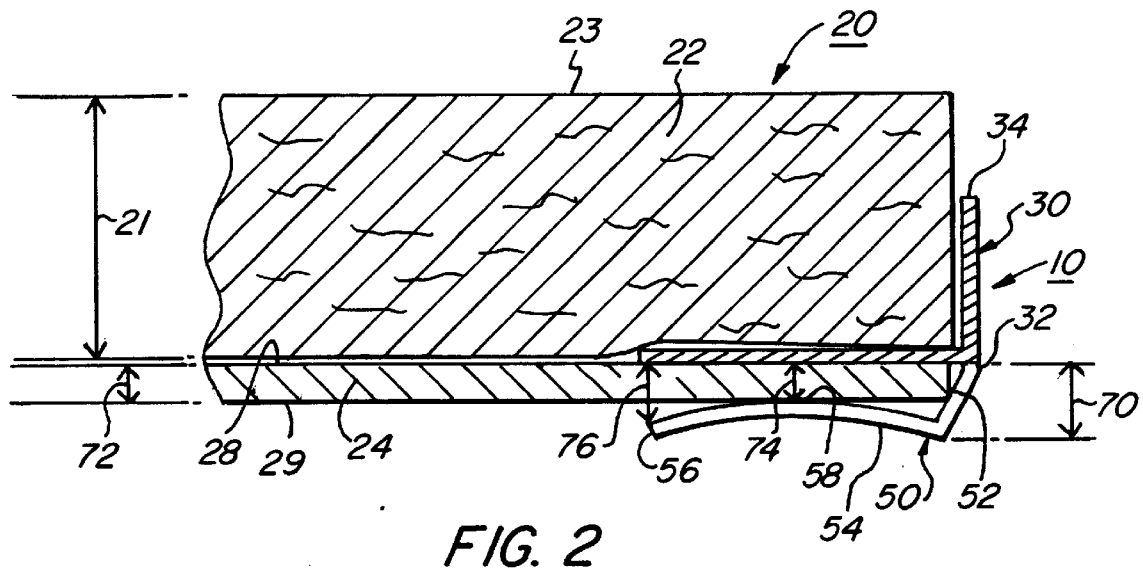
FIG. 2 is a sectional view of the brake pad/shoe taken along the line 2—2 of FIG. 1.

Referring to FIGS. 1 and 2, the present invention provides a clip-on visual brake lining wear indicator 10 for use with brake pad/shoes 20 of a drum brake assembly (not shown). As is known, a brake pad/shoe 20 includes a friction lining 22 secured to a plate 24, with rivets 26 for example. The lining wear indicator 10 according to the present invention clips onto the plate 24 and, as its name implies, provides a visual indication of the wear of the friction lining 22 so that a mechanic, for example, can easily determine whether the brake pad/shoe 20 needs replacement. The wear indicator 10 according to the present invention is easily attached to the plate 24 to provide an inexpensive and simple device for indicating lining wear that can be attached to new brake pad/shoes, old brake pad/shoes, or removed from a worn brake pad/shoe and attached to a replacement brake pad/shoe.

Figure 3:
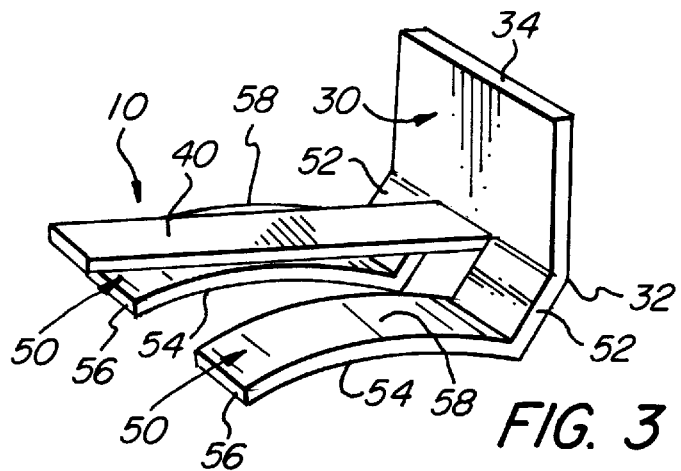
FIG. 3 is a side isometric view of a clip-on, visual brake lining wear indicator according to the present invention.
Figure 4:
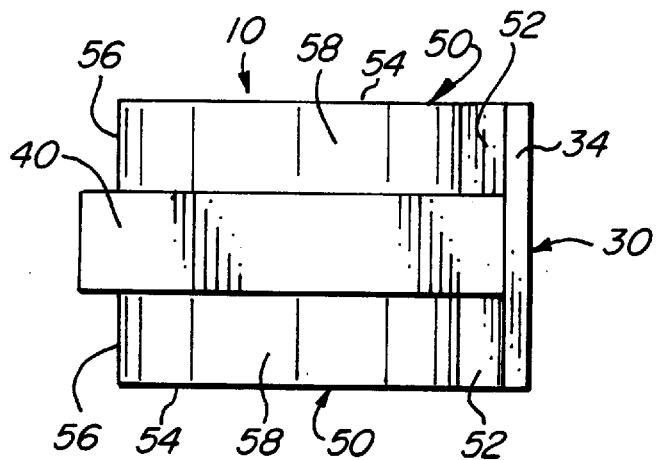
FIG. 4 is a top plan view of the clip-on, visual brake lining wear indicator of FIG. 3.
Figure 5:
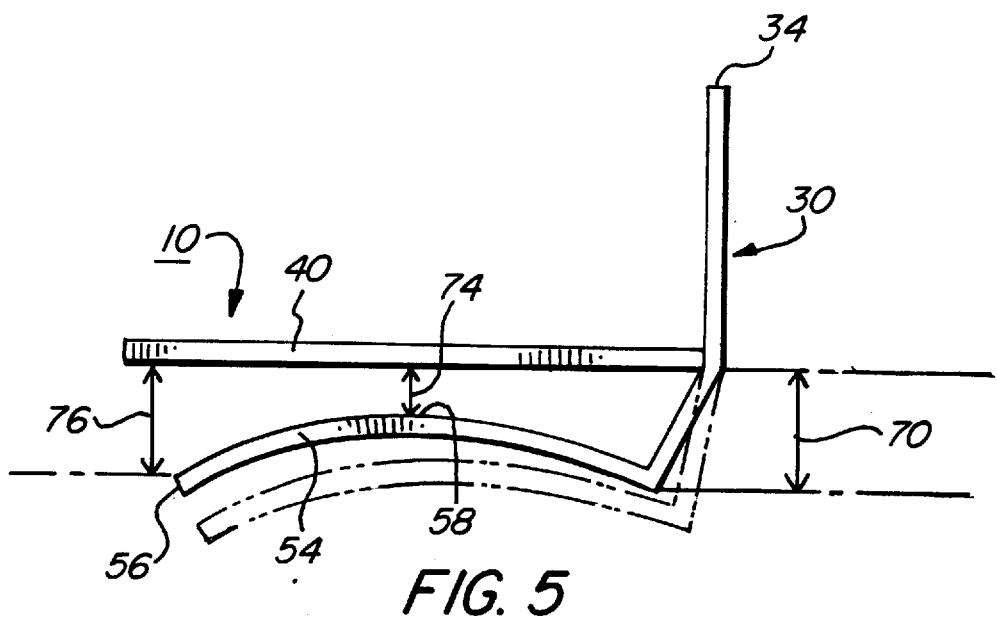
FIG. 5 is a side elevation view of the visual brake wear indicator of FIG. 3 showing elastic deformation of a resilient member of the indicator.

Referring also to FIGS. 3 through 5, the lining-wear indicator 10 is preferably formed from a single flat piece of non-brittle, strong material having some elastic qualities, such as spring steel or even plastic for example, and includes a flag 30, a base 40 and two resilient members 50. The indicator 10 is clipped onto the plate 24 with the base 40 and two resilient members 50, while the flag 30 acts a visual reference against which a thickness 21 of the friction lining 22 can be compared. As shown, the indicator 10 has a single base 40 and two resilient members 50 offset from the base, however, the indicator could include two bases and a single resilient member, or even two bases and three resilient members and vice versa.

The flag 30 is flat and has lower end 32 and a upper end 34. Both the base 40 and the two resilient members 50 extend from the lower end 32 of the flag 30. The base 40 is flat and extends rigidly from, and perpendicular to the flag 30. As shown in FIG. 2, the indicator 10 is attached to the plate 24 so that the base 40 lies against a first face 28 of the plate, while the resilient members extend to a second face of the plate to clamp the base against the plate and hold the flag adjacent the thickness of the lining.

Each resilient member 50 preferably includes a spacer portion 52, which extends from the lower end 32 of the flag 30, away from the upper end 34 at an angle between perpendicular to, and parallel with the base 40. Each resilient member 50 also includes a gripping portion 54 extending from the spacer portion 52 generally parallel with the base 40 to a far end 56.

The spacer portion 52 of each resilient member 50 is sized so that it spaces the gripping portion 54 away from the base 40 and allows the plate 24 to be easily received between the base and the gripping portion. In general, the spacer portion 52 extends in a direction away from the base 40 and parallel to the flag 30 a distance 70 equal to at least a thickness 72 of the plate 24. The gripping portion 54 includes a contact point 58 spaced from the base 40 a distance 74 equal to less than the thickness 72 of the plate 24, so that the resilient member 50 is elastically deformed when the indicator 10 is clipped onto the plate. The elastically deformed resilient member 50 then biases the contact point 58 against the second face 29 of the plate 24 to clamp the base 40 to the plate.

The gripping portion 54 of each resilient member 50 is preferably provided with an arcuate shape having a crown 58 facing the base 40. The crown 58, accordingly, is spaced from the base 40 less than the thickness 72 of the plate 24 and acts as the contact point of the arcuate-shaped gripping portion. A distance 76 between the far end 56 of the gripping portion 54 and the base 40, on the other hand, is greater than the thickness 72 of the plate 24 so that the indicator can be more easily clipped onto the plate. The arcuate shape, therefore, allows the indicator 10 to accept the plate 24 between the base 40 and the far end 56 of the resilient member 50, as the indicator is slid onto the plate, but also requires that the resilient member be elastically deformed as the contact point 58 of the gripping portion 54 contacts the plate. As shown best in FIG. 5, the resilient member 50 is elastically deformed at both the joint between the flag 30 and the spacer portion 52, and the joint between the spacer portion and the gripping portion 54.

Referring back to FIGS. 1 and 2, the indicator 10 is attached to the brake pad/shoe 20 so that the flag 30 extends in the same direction as the friction lining 22. The flag 30 is sized so that its upper end 34 will be equal with an outer surface 23 of the friction lining 22 when the lining has worn down a predetermined amount. By looking at the flag 30 and comparing it to the thickness 21 of the friction lining 22, therefore, the amount of wear of the lining can easily be ascertained. Preferably, the flag 30 is a bright color or painted a bright color, such as orange for example, to optimize its visibility.

One benefit of the indicator 10 according to the present invention, in addition to being inexpensive and simple to manufacture, is that it can be easily attached to existing (or after market) brake pad/shoes, as well as new brake pad/shoes, and can also be easily removed from a worn brake pad/shoe and attached to a replacement brake pad/shoe.

While the indicator 10 is shown attached to a brake shoe 20 of a drum brake assembly, the indicator is also for use with a brake pad of a disc brake assembly. In addition, the resilient member 50 can be provided in many other shapes. For example, the resilient member could be provided with a spacer portion and an inverted V-shaped gripping portion, with a tip, or contact point, of the "V" spaced from the base 40 less than the thickness of the plate 24, and a far end of the V-shaped gripping portion being spaced from the base more than the thickness of the plate. Like the arcuate shaped gripping portion 54 of FIGS. 1 through 5, the V-shaped gripping portion would easily accept the plate 24, yet require elastic deformation of the resilient member.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An indicator for detecting wear of a lining secured to a plate of a brake assembly, the lining having a frictional surface which engages a rotating member, the indicator comprising:

a flag extending adjacent to and along at least a portion of a thickness of the lining toward the frictional surface of the lining;

a first base member extending from the flag generally perpendicular to the flag, said flag and said first base member defining a joint;

a second base member extending from the joint, said first base member and said second base member defining a channel for receiving the plate therebetween; and wherein said joint comprises a three-way joint where said first base member, said second base member and said flag are unitarily attached to one another.

2. An indicator according to claim 1 wherein said first base member and said second base member are biased toward each other, but are movable against the bias to clamp the plate therebetween.

3. An indicator according to claim 1 wherein said flag, said first base member and said second base member are unitary.

4. An indicator according to claim 1 wherein said second base member comprises a spacer portion extending from the joint and a gripping portion extending from the spacer portion, the gripping portion being substantially parallel with the first base member.

5. An indicator according to claim 4 wherein the gripping portion of said second base member has an arcuate shape.

6. A brake pad/shoe comprising:

a plate having opposing first and second surfaces and a periphery;

a lining having opposing first and second surfaces and a thickness, the first surface of the lining secured to the first surface of the plate, and the second surface of the lining comprising a frictional surface adapted to engage a rotating member; and a lining wear indicator comprising, a flag extending adjacent to and along at least a portion of a thickness of the lining toward the frictional surface of the lining;

a first base member extending from the flag generally perpendicular to the flag and adjacent to the first surface of the plate, said flag and said first base member defining a joint;

a second base member extending from the joint and being adjacent to the second surface of the plate, said first base member and said second base member defining a channel for receiving the plate therebetween; and wherein said joint comprises a three-way joint where said first base member, said second base member and said flag are unitarily attached to one another.

7. An indicator according to claim 6 wherein said first base member and said second base member are biased toward each other, but are movable against the bias to clamp the plate therebetween.

8. An indicator according to claim 6 wherein said flag, said first base member and said second base member are unitary.

9. An indicator according to claim 6 wherein said second base member comprises a spacer portion extending from the joint adjacent the periphery of said plate and a gripping portion extending from the spacer portion, the gripping portion being substantially parallel with the first base member.

10. An indicator according to claim 9 wherein the gripping portion of said second base member has an arcuate shape.

* * * * *